United States Patent
Larsson

(10) Patent No.: US 11,397,130 B2
(45) Date of Patent: Jul. 26, 2022

(54) DEVICE FOR DETECTING A DEFECT OF A ROTATING ARRANGEMENT

(71) Applicant: Aktiebolaget SKF, Gothenburg (SE)

(72) Inventor: Per-Erik Larsson, Lulea (SE)

(73) Assignee: Aktiebolaget SKF, Gothenburg (SE)

( * ) Notice: Subject to any disclaimer, the term of this patent is extended or adjusted under 35 U.S.C. 154(b) by 35 days.

(21) Appl. No.: 15/931,490

(22) Filed: May 13, 2020

(65) Prior Publication Data

US 2021/0003477 A1 Jan. 7, 2021

(30) Foreign Application Priority Data

Jul. 1, 2019 (DE) .......................... 102019209605.0

(51) Int. Cl.
| | |
|---|---|
| *G01M 13/04* | (2019.01) |
| *G06F 17/18* | (2006.01) |
| *G06N 20/00* | (2019.01) |
| *G08B 29/18* | (2006.01) |
| *G08B 21/18* | (2006.01) |

(52) U.S. Cl.
CPC .............. *G01M 13/04* (2013.01); *G06F 17/18* (2013.01); *G06N 20/00* (2019.01); *G08B 21/182* (2013.01)

(58) Field of Classification Search
CPC ........ G01M 13/04; G06N 20/00; G06F 17/18; G08B 21/182
See application file for complete search history.

(56) References Cited

U.S. PATENT DOCUMENTS

| | | | |
|---|---|---|---|
| 2003/0065409 A1* | 4/2003 | Raeth ................ | G05B 23/0254 700/31 |
| 2016/0305845 A1 | 10/2016 | Van Der Ham | |
| 2017/0102036 A1 | 4/2017 | Hebrard | |
| 2017/0108406 A1 | 4/2017 | Thomson | |
| 2017/0183016 A1 | 6/2017 | Shah | |
| 2017/0270770 A1 | 9/2017 | Marshall | |
| 2018/0370280 A1 | 12/2018 | Akbarian | |
| 2019/0101103 A1* | 4/2019 | Haseba ................. | F03D 80/70 |
| 2019/0301975 A1 | 10/2019 | Sugiura | |
| 2019/0332102 A1 | 10/2019 | Larsson | |
| 2020/0142392 A1 | 5/2020 | Prabhu | |
| 2020/0225628 A1 | 7/2020 | Larsson | |
| 2020/0382036 A1 | 12/2020 | Shiiya | |
| 2021/0003477 A1 | 1/2021 | Larsson | |

* cited by examiner

*Primary Examiner* — Manuel L Barbee
(74) *Attorney, Agent, or Firm* — Garcia-Zamor Intellectual Property Law; Ruy Garcia-Zamor; Bryan Peckjian

(57) ABSTRACT

A device for detecting a defect of a rotating arrangement is provided. The rotating arrangement further provides one or more rotating elements. The device includes a measuring unit for measuring a parameter of the rotating arrangement for a predefined time period, a calculation unit for calculating a mean value and a standard deviation of the parameter of the predefined time period and for calculating a threshold based on a sum of the mean value and the standard deviation during the predefined time period, and a detection unit for detecting a defect by comparing a current value of the parameter with the calculated threshold. The calculation unit is configured to adjust the calculated threshold using a stability factor. The stability factor is a variable function of the standard deviation and the mean value. A method for detecting a defect of a rotating arrangement is also provided.

13 Claims, 1 Drawing Sheet

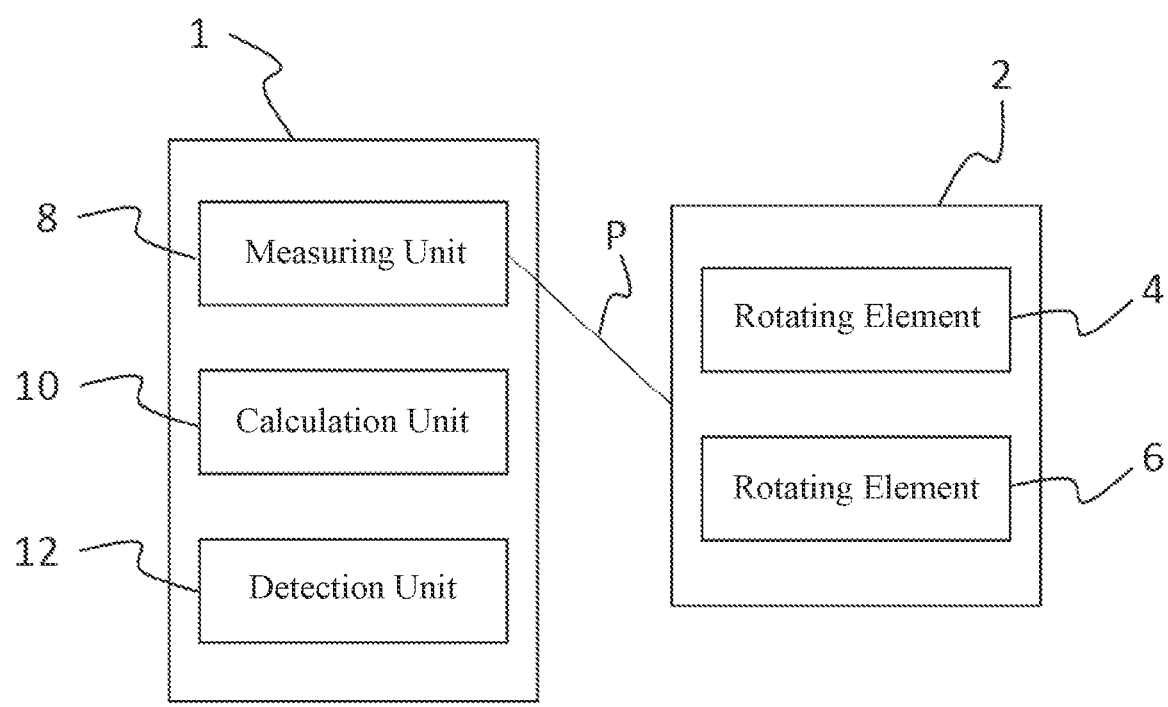

DEVICE FOR DETECTING A DEFECT OF A ROTATING ARRANGEMENT

CROSS-REFERENCE TO RELATED APPLICATIONS

This application claims priority to German Patent Application no. 102019209605.0, filed Jul. 1, 2019, the contents of which is fully incorporated herein by reference.

FIELD OF THE INVENTION

The present invention relates to a device for detecting a defect of a rotating arrangement and to a method for detecting a defect of a rotating arrangement.

BACKGROUND OF THE INVENTION

In a rotating arrangement, for example a bearing, which includes one or more rotating elements like a bearing ring, rolling elements or a cage, it is necessary to monitor the rotating arrangement, in particular the rotating elements, to detect defects or failures of these elements. Such defects may lead to a failure of the complete rotating arrangement, which should be avoided. Today, the methods and devices for detecting such defects may use a threshold for a parameter of the rotating arrangement, wherein the threshold may be set based on a standard deviation and a mean value of the trend of the parameter. Such a threshold setting may be initialized during a learning period after the installation of the rotating arrangement. However, it has been observed that in different applications, distortions, for example vibrations, may occur which may lead to an unstable trend of the parameter value. If the trend of the parameter value is very stable during the setting, a threshold may be set to a threshold very close to the mean value, which may increase the risk of false positives as already small deviations would exceed the threshold and indicate a defect. On the other hand, if the trend of the parameter value is very unstable, the threshold may be set too high in order to compensate for variations due to vibrations, which lead to a risk of defects not being detected in time.

Thus, it is an object of the present invention to provide an improved device and method for detecting a defect of a rotating arrangement for stable as well as unstable parameter measurements.

SUMMARY OF THE INVENTION

With respect to the present invention, the rotating arrangement may be for example a bearing, which includes one or more rotating elements like a bearing ring, rolling elements or a cage. The device for detecting a defect of the rotating arrangement comprises a measuring unit for measuring a parameter of the rotating arrangement for a predefined time period. Measuring in this context may refer to a direct measurement of the parameter or to a calculation of the parameter using other measured values. The parameter may be any parameter of the rotating arrangement which will change when a defect occurs.

In order to be able to define a threshold for this parameter, which will indicate a defect when being exceeded, the device comprises a calculation unit for calculating the threshold. For this purpose, the calculation unit calculates a mean value and a standard deviation of the parameter measured for the predefined time period and then calculates the threshold based on a sum of the mean value and the standard deviation during the predefined time period. The mean value may be calculated as the mean value of all values of the parameter during the predefined time period. The standard deviation may be calculated as the square root of the variance of the parameter values during the predefined time period.

After the threshold is set, a detection unit may detect a defect by comparing a current value of the parameter P with the calculated threshold.

In order to ensure that the calculated threshold is high enough for avoiding false positives and low enough for avoiding false negatives, the calculation unit is configured to adjust the calculated threshold using a stability factor. The stability factor is a variable function of the standard deviation and the mean value. The stability factor compensates oscillations of the measured parameter and ensures that the adjusted threshold is high enough for avoiding false positives and low enough for avoiding false negatives.

According to an embodiment, the predefined time period corresponds to a learning period after the installation of the rotating arrangement. The learning period may take place directly after installation. For example, the learning period may take place before the rotating arrangement is used in real.

According to a further embodiment, the calculation unit is configured to calculate the stability factor according to the equation:

$$SF = 2 - 10 * SDev(CI_{LP}) / Mean(CI_{LP})$$

wherein SF is the stability factor, $CI_{LP}$ are the parameter values during the learning period, $SDev(CI_{LP})$ is the standard deviation of the parameter values during the learning period and $Mean(CI_{LP})$ is the mean value of the parameter values during the learning period.

In order to keep the stability factor within a range between −1 and 1, a limiting condition may be set. Thus, the calculation unit may be configured to set the stability factor to −1 if $SDev(CI_{LP})/Mean(CI_{LP}) \geq 0.3$ and to set the stability factor to 1 if $SDev(CI_{LP})/Mean(CI_{LP}) \leq 0.1$.

According to a further embodiment, the calculation unit is configured to adjust the threshold using an alarm sensitivity factor. Such an alarm sensitivity factor may be used for fine tuning the threshold. The alarm sensitivity factor may be used for defining whether also small deviations of the measured parameter, leading to an early alarm, or only large deviations of the measured parameter, leading to a late alarm, should be covered. The alarm sensitivity factor may be adjusted depending on the rotating arrangement or any user desire.

The threshold TL may thus be set according to the equation:

$$TL = (AS + SF) * SDev(CI_{LP}) + Mean(CI_{LP}),$$

wherein AS is the alarm sensitivity factor. The sensitivity factor can be for example between 3 and 10.

According to a further aspect, a method for detecting a defect of a rotating arrangement is provided. The method comprises the following steps: measuring a parameter of the rotating arrangement for a predefined time period, calculating a mean value and a standard deviation of the parameter of the predefined time period, calculating a threshold based on a sum of the mean value and the standard deviation during the predefined time period, and detecting a defect by comparing a current value of the parameter with the calculated threshold, wherein the method further comprises adjusting the calculated threshold using a stability factor, wherein the stability factor is a variable function of the standard deviation and the mean value.

The embodiments and features described with reference to the device of the present invention apply mutatis mutandis to the method of the present invention.

According to a further aspect, the invention relates to a computer program product comprising a program code for executing the above-described method when run on at least one computer.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

Further advantages and preferred embodiments are disclosed in the claims, the description and the figures. It should be further noted that a person skilled in the art may regard or use the presented features individually or combine the presented features otherwise than indicated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

FIG. 1 shows a schematic block diagram of a device for detecting a defect of a rotating arrangement.

In the following same or similar functioning elements are indicated with the same reference numerals.

DETAILED DESCRIPTION OF THE INVENTION

FIG. 1 shows a device 1 for detecting a defect of a rotating arrangement 2. The rotating arrangement 2 may be any kind of rotating arrangement, for example a bearing, comprising one or more rotating elements 4, 6 like bearing rings, rolling elements or bearing cages. The defect of the rotating arrangement 2 may be a defect of one of the rotating elements 4, 6.

The device 1 comprises a measuring unit 8 for measuring a parameter P of the rotating arrangement 2 for a predefined time period. The measuring unit 8 may a sensor, a sensor device, or any similar electrical or mechanical device capable of measuring the parameter P. The predefined time period may be a learning period which takes place directly after installation of the rotating arrangement 2. The parameter P may be any kind of parameter which can be used for detecting a defect.

For setting a threshold for the parameter, a calculation unit 10 is configured to calculate a mean value and a standard deviation of the parameter P of the predefined time period. The calculation unit 10 calculates a threshold based on a sum of the mean value and the standard deviation. In order to ensure that the calculated threshold is high enough for avoiding false positives and low enough for avoiding false negatives, the calculation unit 10 is further configured to adjust the calculated threshold using a stability factor for compensating oscillations of the measured parameter. The stability factor is a variable function of the standard deviation and the mean value.

In addition, the calculation unit 10 may fine tune the threshold using an alarm sensitivity factor. Using the alarm sensitivity factor provides the possibility to define, independently of the mean value and the standard deviation, whether the threshold should provide an early alarm or a late alarm. The alarm sensitivity factor may be adjusted depending on the rotating arrangement or any user desire.

After setting of the threshold during the learning period, a detection 12 may detect a defect using this threshold. When a current value of the parameter P exceeds the threshold, the detection unit 12 will detect a defect by comparing the current value of the parameter P with the calculated and adjusted threshold.

Thus, by providing a device for detecting a defect of a rotating arrangement as described above using a stability factor, a setting of the threshold as a too high threshold or too low threshold (due to an unstable or stable trend of the parameter during the learning period) may be avoided. Thus, the risk of a false detection (false positive or false negative) of a defect may be reduced.

The invention claimed is:

1. A device for detecting a defect of a rotating arrangement, the rotating arrangement comprising one or more rotating elements, the device comprises:
   a sensor for measuring a parameter of the rotating arrangement for a predefined time period,
   a calculation unit for calculating a mean value and a standard deviation of the parameter of the predefined time period and for calculating a threshold based on a sum of the mean value and the standard deviation during the predefined time period, and
   a detection unit for detecting a defect by comparing a current value of the parameter with the calculated threshold, wherein
   the calculation unit is configured to adjust the calculated threshold using a stability factor, wherein
   the stability factor is a variable function of the standard deviation and the mean value, and wherein
   the calculation unit is configured to calculate the stability factor according to $$SF = 2 - 10 * SDev(CI_{LP})/Mean(CI_{LP})$$

wherein SF is the stability factor, $CI_{LP}$ are the parameter values during the learning period, $SDev(CI_{LP})$ is the standard deviation of the parameter values during the learning period and $Mean(CI_{LP})$ is the mean value of the parameter values during the learning period.

2. The device according to claim 1, wherein the predefined time period corresponds to a learning period after the installation of the rotating arrangement.

3. The device according to claim 1, wherein the calculation unit is configured to set the stability factor to −1 if $SDev(CI_{LP})/Mean(CI_{LP}) \geq 0.3$ and to set the stability factor to 1 if $SDev(CI_{LP})/Mean(CI_{LP}) \leq 0.1$.

4. The device according to claim 1, wherein the calculation unit is configured to adjust the threshold using an alarm sensitivity factor.

5. The device according to claim 4, wherein the calculation unit is configured to adjust the threshold according to $$TL = (AS + SF) * SDev(CI_{LP}) + Mean(CI_{LP}),$$

wherein TL is the threshold and AS is the alarm sensitivity factor.

6. A method for detecting a defect of a rotating arrangement, the rotating arrangement comprising providing one or more rotating elements, the method comprising:
   measuring a parameter of the rotating arrangement for a predefined time period, calculating a mean value and a standard deviation of the parameter of the predefined time period, calculating a threshold based on a sum of the mean value and the standard deviation during the predefined time period, and detecting a defect by comparing a current value of the parameter with the calculated threshold, calculating the stability factor according to $$SF=2-10*SDev(CI_{LP})/Mean(CI_{LP}),$$

wherein SF is the stability factor, $CI_{LP}$ are the parameter values during the learning period, $SDev(CI_{LP})$ is the standard deviation of the parameter values during the learning period and $Mean(CI_{LP})$ is the mean value of the parameter values during the learning period, and adjusting the calculated threshold using a stability factor.

7. The method of claim 6, wherein the step of calculating a mean value and a standard deviation of the parameter of the predefined time period further comprises the predefined time period corresponding to a learning period after the installation of the rotating arrangement.

8. The method of claim 6, further comprising the step of setting the stability factor to −1 if $SDev(CI_{LP})/Mean(CI_{LP}) \geq 0.3$ and to set the stability factor to 1 if $SDev(CI_{LP})/Mean(CI_{LP}) \leq 0.1$.

9. The method of claim 6, wherein the step of adjusting the calculated threshold using a stability factor further comprises adjusting the threshold using an alarm sensitivity factor.

10. The method of claim 9, wherein the step of adjusting the calculated threshold using a stability factor further comprises adjusting the threshold according to $$TL=(AS+SF)*SDev(CI_{LP})+Mean(CI_{LP}),$$

wherein TL is the threshold and AS is the alarm sensitivity factor.

11. A device for detecting a defect of a rotating arrangement, the rotating arrangement comprising one or more rotating elements, the device comprises:

a sensor for measuring a parameter of the rotating arrangement for a predefined time period, a calculation unit for calculating a mean value and a standard deviation of the parameter of the predefined time period and for calculating a threshold based on a sum of the mean value and the standard deviation during the predefined time period, and a detection unit for detecting a defect by comparing a current value of the parameter with the calculated threshold, wherein the calculation unit is configured to adjust the calculated threshold according to $$TL=(AS+SF)*SDev(CI_{LP})+Mean(CI_{LP}),$$

wherein TL is the threshold, AS is the alarm sensitivity factor, SF is the stability factor, $CI_{LP}$ are the parameter values during the learning period, $SDev(CI_{LP})$ is the standard deviation of the parameter values during the learning period and $Mean(CI_{LP})$ is the mean value of the parameter values during the learning period, wherein the stability factor is a variable function of the standard deviation and the mean value, and wherein the calculation unit is configured to calculate the stability factor according to $$SF=2-10*SDev(CI_{LP})/Mean(CI_{LP}).$$

12. The device according to claim 11, wherein the predefined time period corresponds to a learning period after the installation of the rotating arrangement.

13. The device according to claim 11, wherein the calculation unit is configured to set the stability factor to −1 if $SDev(CI_{LP})/Mean(CI_{LP}) \geq 0.3$ and to set the stability factor to 1 if $SDev(CI_{LP})/Mean(CI_{LP}) \leq 0.1$.

* * * * *